United States Patent
Edward

(10) Patent No.: US 10,350,995 B2
(45) Date of Patent: Jul. 16, 2019

(54) DRIVE MOTOR ARRANGEMENT FOR A HYDROSTATIC TRANSMISSION

(71) Applicant: Robert Bosch GmbH, Stuttgart (DE)

(72) Inventor: Iain Edward, North Queensferry (GB)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 15/692,153

(22) Filed: Aug. 31, 2017

(65) Prior Publication Data
US 2018/0056779 A1    Mar. 1, 2018

(30) Foreign Application Priority Data

Aug. 31, 2016 (DE) ........................ 10 2016 216 382

(51) Int. Cl.
| | |
|---|---|
| *F16D 31/02* | (2006.01) |
| *B60K 17/10* | (2006.01) |
| *F16H 61/4043* | (2010.01) |
| *F16H 61/444* | (2010.01) |

(52) U.S. Cl.
CPC .......... *B60K 17/10* (2013.01); *F16H 61/4043* (2013.01); *F16H 61/444* (2013.01)

(58) Field of Classification Search
CPC ... F16H 61/4043; F16H 61/444; F16H 61/452
USPC .......................................... 60/424, 425, 483
See application file for complete search history.

(56) References Cited

U.S. PATENT DOCUMENTS

| | | | | |
|---|---|---|---|---|
| 2,959,923 A * | 11/1960 | Shook | ............... | F16H 61/452 60/427 |
| 3,442,344 A * | 5/1969 | Ocule | ............... | F16H 61/452 60/424 |
| 6,609,368 B2 * | 8/2003 | Dvorak | ............... | F16H 61/448 60/425 |
| 7,614,226 B2 * | 11/2009 | Legner | ............... | F16H 61/444 60/483 |
| 8,978,375 B2 * | 3/2015 | Prigent | ............... | F16H 61/4096 60/488 |
| 9,038,378 B2 * | 5/2015 | Heren | ............... | F16H 61/448 60/483 |
| 9,765,502 B2 * | 9/2017 | Heybroek | ............... | F15B 21/08 |
| 2014/0373523 A1 * | 12/2014 | Brown | ............... | F16H 61/4043 60/420 |

FOREIGN PATENT DOCUMENTS

| | | |
|---|---|---|
| DE | 10 2010 015 498 A1 | 10/2011 |
| DE | 10 2011 118 255 A1 | 5/2013 |
| DE | 10 2013 211 621 A1 | 12/2014 |

* cited by examiner

*Primary Examiner* — Michael Leslie
(74) *Attorney, Agent, or Firm* — Maginot, Moore & Beck LLP

(57) ABSTRACT

A hydrostatic transmission includes a side having an upstream radial piston motor and a downstream radial piston motor. The motors are connected to each other in series via a connecting line. A flow control valve is configured to discharge pressure medium from the connecting line so that the downstream motor is only engaged in the event of a predetermined amount of slippage of the upstream motor. Each motor has at least two groups of working flanks. Each flank is configured to operatively interact with a high pressure, such that each motor has at least two transmission steps.

9 Claims, 2 Drawing Sheets

DRIVE MOTOR ARRANGEMENT FOR A HYDROSTATIC TRANSMISSION

This application claims priority under 35 U.S.C. § 119 to patent application no. DE 10 2016 216 382.5, filed on Aug. 31, 2017 in Germany, the disclosure of which is incorporated herein by reference in its entirety.

The disclosure relates to a drive motor arrangement for a hydrostatic transmission having a first continuously driven hydraulic motor and a second hydraulic motor having the ability to be activated or engaged.

BACKGROUND

Publication DE 10 2010 015 498 A1 discloses a hydrostatic transmission, in which a left-hand and a right-hand drive motor arrangement are supplied via a common adjustable pump in a common closed circuit. The two hydraulic motors on each side and each drive motor arrangement are connected to one another in series. The two upstream hydraulic motors are driven in the course of the normal operation of the vehicle concerned in two-wheel drive mode, whereas the two downstream hydraulic motors are essentially only idling. A quantity of pressure medium is discharged constantly from the connecting lines between the two hydraulic motors on each side for this purpose, so that the respective upstream hydraulic motor converts no energy or only little energy and delivers no torque or only little torque. A common or a respective constant flow regulator, which is referred to below as a flow control valve, is connected to the connecting lines for this purpose.

Automatic switching from two-wheel drive mode to four-wheel drive mode takes place if the slippage of an upstream hydraulic motor increases, and if the corresponding wheel accordingly "spins". The downstream hydraulic motor is then also supplied with pressure medium in such a way that this also converts energy and delivers torque in the sense of an all-wheel drive system.

Publication DE 10 2011 118 255 A1 discloses a similar hydrostatic transmission, of which the performance is improved by a control valve in the event of steering movements by the vehicle concerned. Said valve permits the equalization of the pressure medium between the connecting lines of the two drive motor arrangements, that is to say from the connecting line of the curve inner wheel to the connecting line of the curve outer wheel.

Disclosed in DE 10 2013 211 621 A1 is a drive motor arrangement for one side of a hydrostatic transmission having an upstream hydraulic motor and a downstream hydraulic motor in a closed circuit. The publication discloses an integration of the flow control valve connected to the connecting line into the housing of one of the hydraulic motors.

A disadvantage associated with suchlike drive motor arrangements is that their hydraulic motors always have a fixed displacement, so that a constant speed of travel, that is to say only a single transmission step, results at a constant supply of pressure medium.

SUMMARY

On the other hand, the disclosure has as its object to make available a drive motor arrangement for a hydrostatic transmission, which permits at least two transmission steps at a constant supply of pressure medium.

Said object is accomplished by a drive motor arrangement according to this disclosure.

The disclosed drive motor arrangement is designed to constitute one side of a hydrostatic transmission. The drive motor arrangement has a first radial piston motor and, connected in series, a second radial piston motor, which is capable of activation or engagement in the event of increasing slippage of the first radial piston motor. All the unidirectional high-pressure or working flanks of each radial piston motor are subdivided into at least two groups, the groups being capable of activation individually or jointly. Each radial piston motor thus has a displacement that is variable or adjustable in particular in steps and a corresponding number of transmission steps. A flow control valve is connected to the connection between the outlets of the groups of the first radial piston motor and the inlets of the groups of the second radial piston motor. When the vehicle concerned is driving forwards, this permits the required activation or engagement of the second radial piston motor with the continuously driven first radial piston motor. When the vehicle concerned is driving backwards with a reversed direction of flow of the pressure medium through the drive motor arrangement, the flow control valve permits the required activation or engagement of the first radial piston motor with the continuously driven second radial piston motor.

The flow control valve is preferably constituted by a measuring orifice and a pressure compensator connected in series thereto, of which the valve body is impinged upon in the closing direction by the pressure upstream of the measuring orifice, and in the opening direction by the pressure downstream of the measuring orifice and by the force of a spring.

If the flow control valve is arranged on a housing of one of the radial piston motors or is integrated into the housing, and if an outlet of the flow control valve is connected to an interior space of the housing, housing flushing of the radial piston motor is accomplished. The flow control valve is preferably arranged on the housing of the first radial piston motor or is integrated into its housing, since this radial piston motor converts the most energy and exhibits the greatest heating when driving predominantly forwards and when driving largely in two-wheel drive mode.

The outlets of the groups of the first radial piston motor are connected via respective branch lines on the outlet side to a common connecting line, wherein the connecting line, on the other hand, is connected via respective branch lines on the inlet side of the second radial piston motor to the inlets of the groups of the second radial piston motor. The branch lines are preferably formed as branch ducts in the housing of the radial piston machine concerned. The common connecting line preferably has a respective section of connecting duct in the housing of each radial piston motor.

The flow control valve can be connected according to a first embodiment directly to the connecting line, in particular to the section of connecting duct in the housing of the first radial piston motor. According to a second embodiment, the flow control valve can be connected to one of the branch lines on the outlet side in the housing of the first radial piston motor.

In a particularly preferred further development of the disclosed drive motor arrangement, the at least one further group of each radial piston motor is capable of activation and deactivation with a respective displacement change-over valve.

An inlet and an outlet of the further group are capable of connection or are connected to one another via the displacement change-over valve, preferably in a deactivation position that is pretensioned by a spring, wherein a pressure-equalized circulation or virtually a hydraulic short-circuit of the further group is established.

The inlet of the first group can be connected directly to the inlet of the radial piston motor, or it is permanently connected to the inlet of the radial piston motor via the displacement change-over valve.

According to a device-related, simple first variant, the displacement change-over valve is a 4/2-way valve, via the deactivation position of which the inlet and the outlet of the further group are connected to an outlet of the radial piston motor. As a result, the circulation of the pressure medium in the deactivated further group takes place in the first radial piston motor under the pressure of the connecting line, that is to say an intermediate pressure, or under negative pressure. In the second radial piston motor, the circulation of the pressure medium takes place in the deactivated further group under negative pressure. This is always the case for forward travel.

In a specific embodiment of the first variant, in the deactivation position of the 4/2-way valve, a first connection of the 4/2-way valve connected to the inlet of the radial piston motor is connected to the inlet of the first group, whereas a second connection of the 4/2-way valve connected to the outlet of the radial piston motor is connected to the inlet of the further group. In an activation position of the 4/2-way valve, the first connection connected to the inlet of the radial piston motor is connected to the respective inlets of both groups, whereas the second connection connected to the outlet of the radial piston motor is shut off.

According to a second device-related, more complicated variant, the displacement change-over valve is a 5/2-way valve, via the deactivation position of which the inlet and the outlet of the further group are capable of connection to a control pressure connection.

A shut-off valve, which is switchable into its opening position via the control pressure connection against the force of a spring, can be arranged between the control pressure connection and the 5/2-way valve.

In a specific embodiment of the second variant, in the deactivation position of the 5/2-way valve, a first connection connected to the inlet of the radial piston motor and a second connection connected to the outlet of the radial piston motor are shut off, whereas a third connection connected to the shut-off valve is connected to the inlet and to the outlet of the further group. In an activation position of the 5/2-way valve, the first connection is connected to the inlet of the further group, whereas the second connection is connected to the outlet of the second group. The third connection is shut off in this case.

BRIEF DESCRIPTION OF THE DRAWINGS

Two illustrative embodiments of a drive motor arrangement for a hydraulic transmission according to this disclosure are described in detail below on the basis of the drawings.

In the drawings.

DETAILED DESCRIPTION

Figure 1:
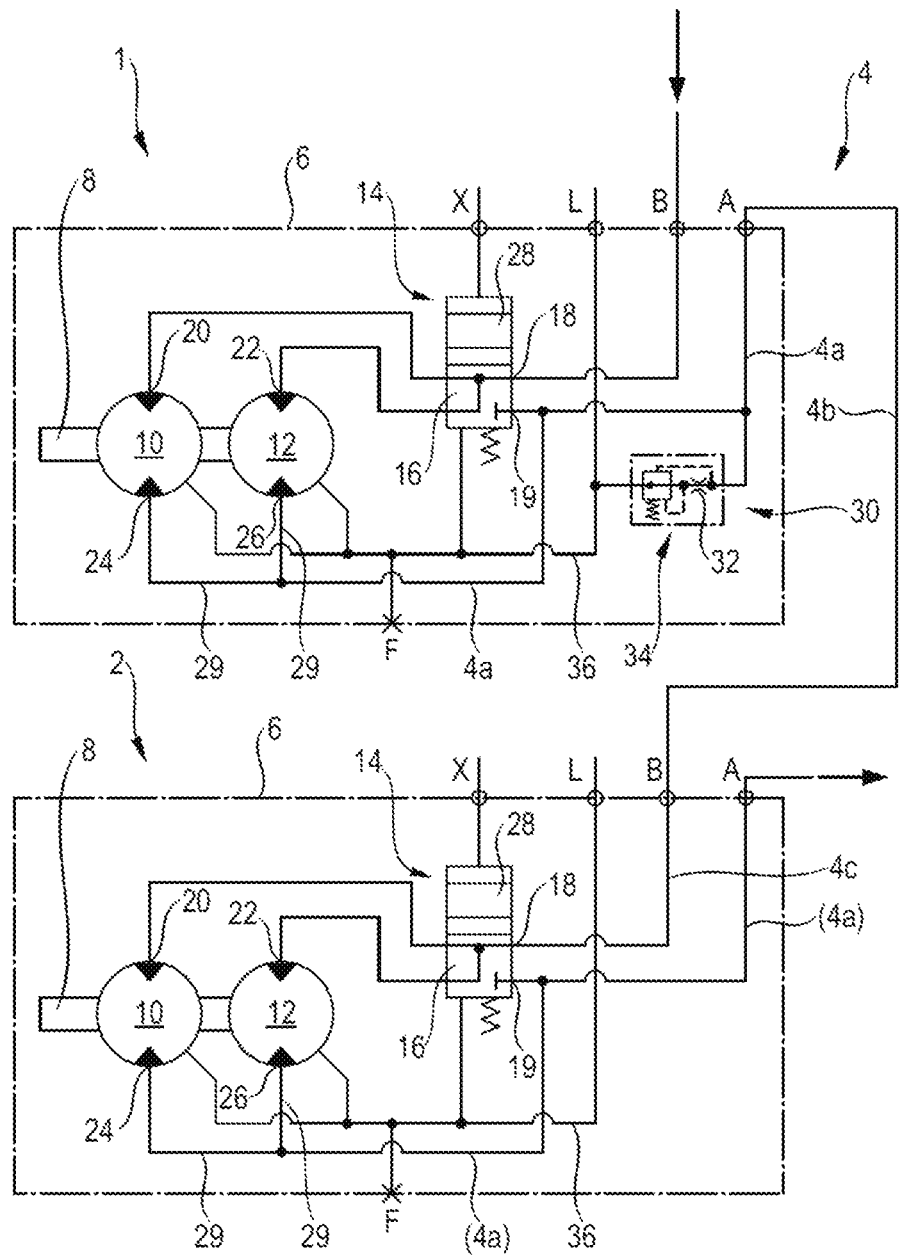
FIG. 1 depicts a schematic diagram of a first illustrative embodiment of a drive motor arrangement according to this disclosure.

FIG. 1 depicts the first illustrative embodiment of the disclosed drive motor arrangement having a first radial piston motor 1 and a second radial piston motor 2, which are connected to one another in series. Pressure medium under high pressure is supplied to the inlet B of the first radial piston motor 1 via a pump, which is not illustrated here, and a closed hydraulic circuit. A connecting line 4 or, in particular, a main section 4b of the connecting line 4 is provided between an outlet A of the first radial piston motor and an inlet B of the second radial piston motor. In the second case, the connecting line 4 has a section 4a of connecting duct in the interior of the housing 6 of the first radial piston motor 1 and a section 4c of connecting duct in the interior of the housing 6 of the second radial piston motor 2.

The radial piston motors 1, 2 each have an output shaft 8, which is capable of being brought into operative interaction with a respective first group 10 and with a second group 12 of working flanks for the purpose of displacing pressure medium. According to a first variant, the working flanks of both groups are each distributed uniformly on the periphery of a common stroke ring of each radial piston motor 1, 2. According to a second variant, the two groups 10, 12 are distributed on separate stroke curves of the respective radial piston motor 1, 2, so that each radial piston motor 1, 2 virtually has two partial motors that are arranged adjacent to one another, both of which are connected to the common drive shaft 8 of each radial piston motor 1, 2.

Each radial piston motor 1, 2 has a displacement change-over valve 14 configured as a 4/2-way valve. Its valve body has the activation position 16 depicted in FIG. 1 that is pretensioned by a spring. In this case, a first connection 18 connected to the inlet B of the radial piston motor is connected to the inlets 20, 22 of both groups 10, 12. The outlets 24, 26 of both groups 10, 12 are connected via a respective branch line 29 on the outlet side and via the first section 4a of connecting duct to the outlet A of the radial piston motor 1, 2. Both groups 10, 12 are thus active in the activation position 16 of the displacement change-over valve 14, whereby the respective radial piston motor 1, 2 has a maximum displacement.

When the displacement change-over valve 14 is switched into a deactivation position 28 against the force of the spring by being impinged upon with control pressure medium via a control pressure connection X, the connections and thus the function of the first group 10 remain unchanged. In the second group 12, on the other hand, the inlet 22 is connected to the outlet 26, so that the second group 12 is pressure-equalized and thus deactivated. The displacement of the respective radial piston motor 1, 2 is reduced as a result. More precisely, the inlet 22 and the outlet 26 of the second group 12 are connected to the first section 4a of connecting duct, so that the pressure of the connecting line 4 acts to either side of the second group 12 in the first radial piston motor 1, whereas the lower pressure of the outlet A acts in the second radial piston motor 2.

In order to disengage the wheel of the second radial piston motor 2 automatically in the event of an increase in the slippage of a wheel (not illustrated here), which is connected to the drive shaft 8 of the first radial piston motor 1, a flow control valve 30, having a measuring orifice 32 and a pressure compensator 34 connected in series downstream of the measuring orifice 32, is provided on the first section 4a of connecting duct of the first radial piston motor 1 on its housing 6 or in the interior of its housing 6, of which the valve body is impinged upon, in the closing direction, by the pressure upstream of the measuring orifice 32 and, in the opening direction, by the pressure downstream of the measuring orifice 32 and by the force of a spring. A defined drop in pressure is thus set by the pressure equivalent of the spring via the measuring orifice 32. A constant pressure medium volumetric flow rate flowing via the flow control valve 30, which is diverted from the connecting line 4, is established in conjunction with the size of the flow cross-section of the measurement orifice 32. On the outlet side, the flow control valve 30 discharges into a leakage line 36, which is connected to a leakage connection L and a connection F.

FIG. 1 depicts the two displacement change-over valves 14 in their respective activation position, so that both radial piston motors 1, 2 have a maximum displacement. In this case, the entire pressure medium flows, as indicated by the arrows, initially through the inlet B of the first radial piston motor 1, then through both groups 20, 22 of the first radial piston motor 1, and then to the outlet A of the first radial piston motor 1, further via the main section 4b of the connecting line 4 to the inlet B of the second radial piston motor 2, and from there via the two groups 10, 12 of the second radial piston pump 2 to its outlet A.

In the first illustrative embodiment of the disclosed drive motor arrangement according to FIG. 1, it is also possible to drive backwards by reversing the direction of flow (against the indicated arrows), wherein the diversion of the pressure medium from the connecting line 4 via the flow control valve 30 is assured, so that automatic switching or activation of the first radial piston motor to the continuously driven second radial piston motor is possible. Deactivation of the respective second group 12 of the two radial piton motors 1, 2 is not possible, however, in the case of driving backwards.

Figure 2:
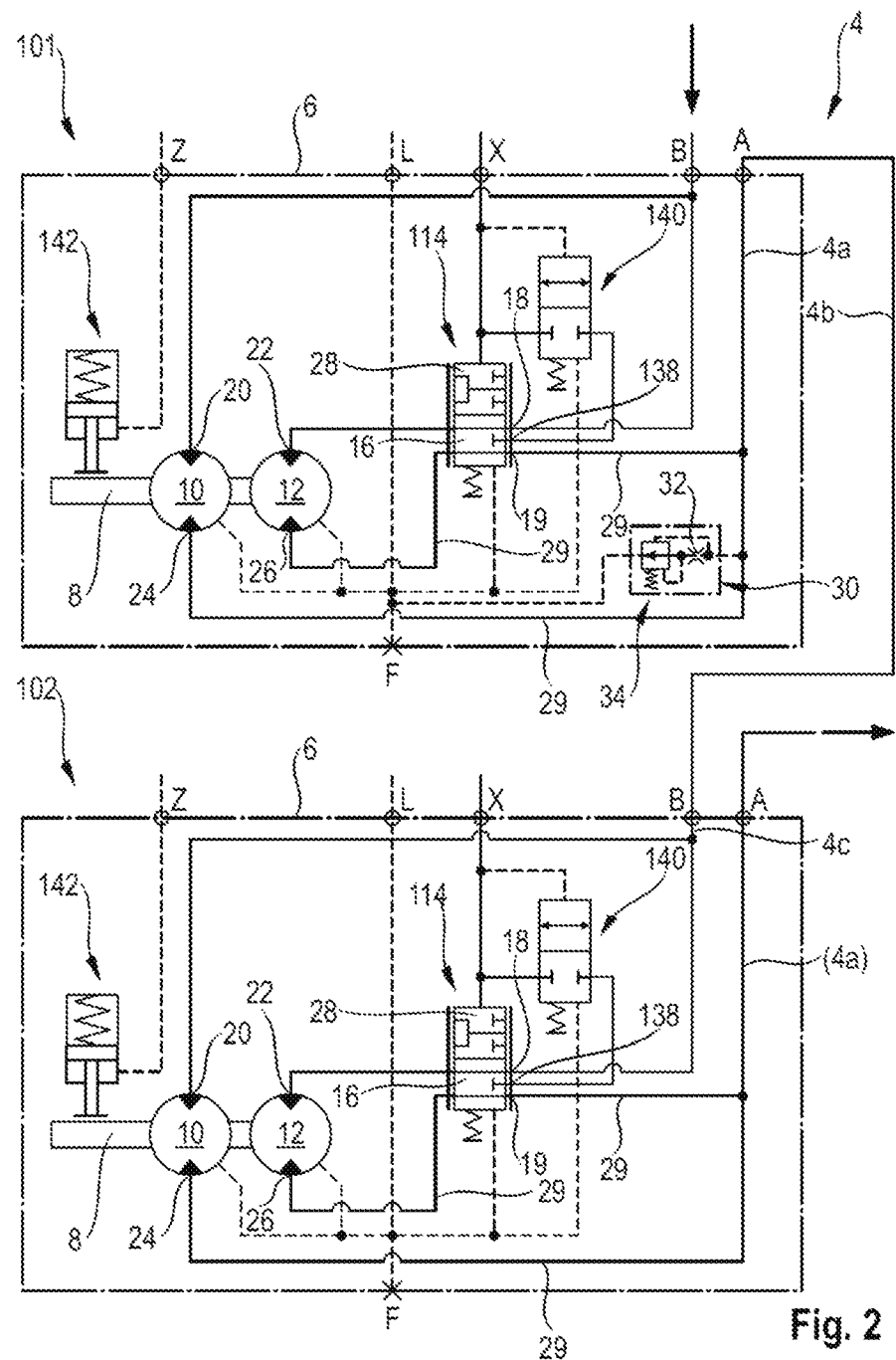
FIG. 2 depicts a schematic diagram of a second illustrative embodiment of a drive motor arrangement according to this disclosure.

FIG. 2 depicts the second illustrative embodiment of the disclosed drive motor arrangement, wherein the two radial piston motors 101, 102 that are connected in series, of which the respective housings 6 and the connections A, B, X, L and F respectively formed thereon, including the one flow control valve 30, correspond in principle to those of the first illustrative embodiment according to FIG. 1.

In contrast to the first illustrative embodiment according to FIG. 1, the flow control valve 30 is not connected directly to the connecting line 4, but rather to the branch line 29 on the outlet side, which connects the outlet 24 of the first group 10 to the connecting line 4.

Due to a more complicated design of the displacement change-over valve 114, in the second illustrative embodiment according to FIG. 2, driving forwards and driving backwards respectively are possible with both groups 10, 12 or with only a single group 10. For this purpose, the displacement change-over valve 114 is configured as a 5/2-way valve and, in addition to the first connection 18, which is connected to the inlet B, and the second connection 19, which is connected to the outlet A of the respective radial piston motor 101, 102, has a third connection 138, which is connected to the control pressure connection X via a control pressure line. A shut-off valve 140, which shuts off this connection in a position that is pretensioned by a spring, is provided in this control pressure line.

FIG. 2 depicts the respective displacement change-over valve 114 of the two radial piston motors 101, 102 in the respective activation position 16, in which both groups 10, 12 are activated. More precisely, the two groups 10, 12 of the first radial piston motor 101 are supplied with high pressure in this case, whereas the two groups 10, 12 of the second radial piston motor 102 are supplied with the reduced pressure of the connecting line 4. For this purpose, the first connection 18 of the displacement change-over valve 114 is connected to the inlet 22 of the second group 12, whereas the second connection 19 of the displacement change-over valve 114 is connected to the outlet 26 of the second group 12.

If it is now wished to shift the disclosed drive motor arrangement into a second transmission step, the two displacement change-over valves 114 are switched into their respective deactivation position 28. This takes place by the impingement of the control pressure connection X with control pressure medium. Since a spring of the displacement change-over valve 114 is slightly weaker (e.g. equivalent to 12 bar) than a spring of the shut-off valve 140 (e.g. equivalent to 15 bar), the displacement change-over valve 114 switches initially into its deactivation position 28, before the shut-off valve 140 opens a control pressure connection from the control pressure connection X to the inlet 22 and to the outlet 26 of the second group 12. As a result, the second group 12 is pressure equalized under control pressure. The first connection 18 and the second connection 19 of the displacement change-over valve 114 are then shut off.

Furthermore, a brake 142, which can be released by a supply to a connection Z, is provided on each drive shaft 8.

The radial piston motors 1, 2 of the first illustrative embodiment require three commutators or rotating unions for the various operating states, whereas the radial piston motors 101, 102 of the second illustrative embodiment require four commutators or rotating unions for the various operating states.

Disclosed is one side of a hydrostatic transmission having an upstream and a downstream radial piston motor, which motors are connected to one another in series via a connecting line. Pressure medium can be discharged from the connecting line via a flow control valve, so that the downstream radial piston motor is only engaged in the event of a certain slippage of the upstream radial piston motor. Each radial piston motor has at least two groups of working flanks, which are capable of being brought into operative interaction with high pressure, so that each radial piston motor possesses at least two transmission steps.

LIST OF REFERENCE DESIGNATIONS

1; 101 first radial piston motor
2; 102 second radial piston motor
4 connecting line
4a first section of connecting duct
4b main section
4c second section of connecting duct
6 housing
8 output shaft
10 first group
12 second group
14; 114 displacement change-over valve
16 activation position
18 first connection
19 second connection
20 inlet of the first group
22 inlet of the second group
24 outlet of the first group
26 outlet of the second group
28 deactivation position
29 branch line on the outlet side
30 flow control valve
32 measurement orifice
34 pressure compensator
36 leakage line
138 third connection
140 shut-off valve
142 brake
A outlet of the radial piston motor
B inlet of the radial piston motor F connection
L leakage connection
X control pressure connection
Z connection

What is claimed is:

1. A drive motor arrangement for a hydrostatic transmission, comprising:
   a first radial piston motor having a variable or adjustable displacement and including a first plurality of unidirectional working flanks subdivided into a first plurality of sub-groups that are configured to activate individually and jointly, and that each include a respective first inlet and a respective first outlet;
   a second radial piston motor having a variable or adjustable displacement and including a second plurality of unidirectional working flanks subdivided into a second plurality of sub-groups that are configured to activate individually and jointly, and that each include a respective second inlet and a respective second outlet, wherein the respective first outlets of the first radial piston motor are connected with the respective second inlets of the second radial piston motor via a connection such that the second radial piston motor is connected in series with the first radial piston motor;
   a flow control valve connected to the connection between the respective first outlets of the first radial piston motor and the respective second inlets of the second radial piston motor;
   a respective displacement change-over valve for each of the first radial piston motor and the second radial piston motor; and
   a spring configured to pretension the respective displacement change-over valve,
   wherein at least one sub-group of each of the first radial piston motor and the second radial piston motor is configured to activate and deactivate via the respective displacement change-over valve,
   wherein the respective displacement change-over valve is configured to connect an inlet and an outlet of the at least one sub-group to each other in a deactivation position, and
   wherein the respective displacement change-over valve is a 5/2-way valve such that, in the deactivation position, the respective displacement change-over valve is configured to connect an inlet and an outlet of the at least one sub-group to a control pressure connection.

2. The drive motor arrangement of claim 1, wherein the flow control valve is positioned on or is integrated into a housing of the first radial piston motor or the second radial piston motor such that an outlet of the flow control valve is connected to an interior space of the housing.

3. The drive motor arrangement of claim 1, further comprising:
   a common connecting line that is connected to each of the respective first outlets via a respective branch line.

4. The drive motor arrangement of claim 3, wherein the flow control valve is connected to the common connecting line.

5. The drive motor arrangement of claim 3, wherein the flow control valve is connected to one of the respective branch lines on an outlet side of the respective first outlets of the first plurality of sub-groups.

6. The drive motor arrangement of claim 1, wherein:
   each of the first radial piston motor and the second radial piston motor further includes a respective motor outlet;
   the respective displacement change-over valve is a 4/2-way valve such that, in the deactivation position, the respective displacement change-over valve is configured to connect the inlet and the outlet of the at least one sub-group to the respective motor outlet.

7. The drive motor arrangement of claim 6, wherein:
   each of the first radial piston motor and the second radial piston motor further includes a respective motor inlet; and
   the respective displacement change-over valve includes:
      a first connection that (i) connects the respective motor inlet to an inlet of a further sub-group in the deactivation position, and (ii) connects the respective motor inlet to the inlet of the at least one sub-group and the inlet of the further sub-group in an activation position of the respective displacement change-over valve; and
      a second connection that connects the respective motor outlet to the inlet of the at least one sub-group in the deactivation position, and that is shut off in the activation position.

8. The drive motor arrangement of claim 1, further comprising
   a shut-off valve positioned between the control pressure connection and the respective displacement change-over valve, the shut-off valve switchable into an opening position via the control pressure connection.

9. The drive motor arrangement of claim 8, wherein:
   each of the first radial piston motor and the second radial piston motor further includes a respective motor inlet;
   each of the first radial piston motor and the second radial piston motor further includes a respective motor outlet; and
   the respective displacement change-over valve includes:
      a first connection that is shut off in the deactivation position, and that connects the respective motor inlet to the inlet of the at least one sub-group in an activation position of the respective displacement change-over valve;
      a second connection that is shut off in the deactivation position, and that connects the respective motor outlet to the outlet of the at least one sub-group in the activation position; and
      a third connection that connects the shut-off valve to the inlet and the outlet of the at least one sub-group in the deactivation position, and that is shut off in the activation position.

* * * * *